Patented Feb. 3, 1931

1,791,066

UNITED STATES PATENT OFFICE

ROWLAND D. SMITH, OF CORNING, NEW YORK, ASSIGNOR TO CORNING GLASS WORKS, OF CORNING, NEW YORK, A CORPORATION OF NEW YORK

TREATING GLASS ARTICLES

No Drawing.   Application filed April 30, 1930.   Serial No. 448,788.

This invention relates to treating glass articles and more particularly to preventing of loss of strength of inside frosted articles such as lamp bulbs.

It is well known that the surface of certain glasses which has been frosted is subject to "weathering" which causes a mechanical weakening when the article is subjected to rapid heating.

It is a matter of common knowledge that when lamp bulbs prior to being fabricated into lamps are stored for indefinite periods so that both their inner and outer surfaces are exposed to "weathering" and they are subjected to the rapid heating incident to lamp manufacture, they become mechanically weakened. This condition becomes serious when inside frosted bulbs are used as a slight external blow on the bulb is very likely to cause it to break.

The object of the present invention is to prevent mechanical weakening of glass articles which is caused by "weathering".

I have discovered that by using certain salts in the water in which the bulbs are washed after frosting that different results may be obtained; for instance, calcium or lime salts are very detrimental to the strength of the articles whereas aluminum salts in the wash water have been found to maintain the strength of the articles. Moreover, I have discovered that the injurious effects of certain salts naturally present in the wash water may be completely overcome by the addition of other salts, and I not only am able to neutralize the undesirable effects of the natural salt, but can so control the composition as to produce a beneficial effect.

My invention embodies the introduction into the wash water in which glass articles are to be washed of a sufficient quantity of aluminum salts to cause the articles to retain their strength so that they may be stored for indefinite periods without serious weakening when they are subsequently subjected to rapid heating.

In carrying my invention into practice, I introduce into the wash water, for instance, one which contains in terms of oxides ten (10) parts per million of lime, two (2) parts per million of magnesia, and six (6) parts per million of sulphuric anhydride, one hundred (100) parts per million of aluminum fluoride. By doing this I not only overcome the detrimental effects of the lime and magnesium salts initially present in the wash water, but eliminate the ill effects of "weathering" such as above described.

While from the foregoing it may seem that I am merely off-setting the detrimental effects of the lime and magnesium salts, I have found that pure distilled water to which no aluminum fluoride has been added will not produce as good results as the water above referred to, treated as set forth.

On the other hand, I still further can improve the resistance of glass articles to such mechanical weaking by using pure distilled water to which there has been added about two hundred (200) parts per million of aluminum fluoride.

I have found that it is desirable that these solutions of aluminum salts should be kept clear and free from residue such as may result from hydrolysis or repeated use because the presence in the solution of a residue which may be deposited on the glass during washing tends to lessen the beneficial effect of the washing.

While in the above I refer to aluminum fluoride, I have found that aluminum sulphate will, under proper conditions and circumstances, serve equally well as the fluoride. Furthermore I have found that certain simple organic salts of aluminum such as for example simple aluminum salts of aliphatic organic acids, will, under the proper conditions and circumstances, serve equally as well as the fluoride. By the term simple aluminum salt I mean a single salt as distinguished from a double aluminum salt. As examples of these I mention the tartrate, the oxalate and the acetate which, if dissolved in the amounts specified and applied in the manner above described give equally as good results as the fluoride. I therefore do not desire to be limited to the use of any particular salt except as indicated by the scope of the following claims. Furthermore, I do not wish to be limited as to the quantities of the aluminum salts set forth in the foregoing examples as these quantities added to the water may be varied up to seven hundred fifty (750) parts per million in accordance with the chemical composition of the water used.

This application is a continuation in part of my previous application, Serial Number 344,592, filed March 5, 1929, in which I have described the method of treating frosted glass articles by washing them with a solution containing aluminum fluoride or aluminum sulfate.

I claim:

1. The method of treating frosted glass articles which includes washing them in a water solution of a simple aluminum salt of an aliphatic organic acid.

2. The method of treating frosted glass articles which includes washing them in a water solution of not more than seven hundred fifty parts per million of a simple aluminum salt of an aliphatic organic acid.

3. The method of treating frosted glass articles which includes washing them in a water solution of simple aluminum tartrate.

4. The method of treating frosted glass articles which includes washing them in a water solution of not more than seven hundred fifty parts per million of simple aluminum tartrate.

ROWLAND D. SMITH.